United States Patent

Somerville

[15] 3,661,535

[45] May 9, 1972

[54] PROCESS FOR DRYING HYDROPHILIC ORES AND RECOVERING SULFUR THEREFROM

[72] Inventor: Robert L. Somerville, Neshanic, N.J.
[73] Assignee: Singmaster & Breyer, New York, N.Y.
[22] Filed: Sept. 13, 1968
[21] Appl. No.: 759,656

[52] U.S. Cl..................................23/306, 23/312, 203/12, 203/69, 159/17 VS
[51] Int. Cl. ..................B01d 1/00, B01d 3/36, B01d 11/02
[58] Field of Search..................23/312, 224; 209/5; 159/17, 159/17 VS; 202/174; 203/69, 12

[56] References Cited

UNITED STATES PATENTS

| 2,272,951 | 2/1942 | Morf.................................202/174 X |
| 2,890,941 | 6/1959 | Bartlett..............................23/312 X |
| 2,934,414 | 4/1960 | Bradley...............................23/312 |
| 3,063,817 | 11/1962 | Simpson..............................23/312 |

FOREIGN PATENTS OR APPLICATIONS

| 608,143 | 9/1948 | Great Britain..........................23/312 |
| 690,839 | 4/1953 | Great Britain..........................23/312 |

OTHER PUBLICATIONS

Percy, Chemical Engineers' Handbook, 3rd Edi., 1950, pages 1453 thru 1456.
Deco Trefoil, Sept.– Oct. 1954, page 21.
Taggert, Handbook of Mineral Dressing, John Wiley and Sons, 1945, pp. 3– 120 and 12– 130.
Perry, Chemical Engineers' Handbook, 3rd Edi., McGraw-Hill, 1950, pp. 508 509.

*Primary Examiner*—Norman Yudkoff
*Assistant Examiner*—S. J. Emery
*Attorney*—Curtis, Morris & Safford

[57] ABSTRACT

A process for removing water from a water-wet hydrophilic solid is shown. A slurry of wet, particulate solid in water-immiscible organic liquid is evaporated; the vapor including water and organic is removed; and solid of reduced water contact is separated from residual organic liquid. Preferably, evaporation takes place in a multiple-effect evaporation zone, and organic liquid is recovered and reused in the process. More specifically, a leaching process for recovering elemental sulfur in hydrophilic ore is shown. Xylene, in which sulfur is soluble, is used to slurry a flotation concentrate of hydrophilic ore. Evaporation of a water-xylene azeotrope from the slurry in a double effect evaporator permits the xylene to contact and dissolve the sulfur. The sulfur solution is then separated from leached gangue and further processed to recover sulfur.

1 Claims, 1 Drawing Figure

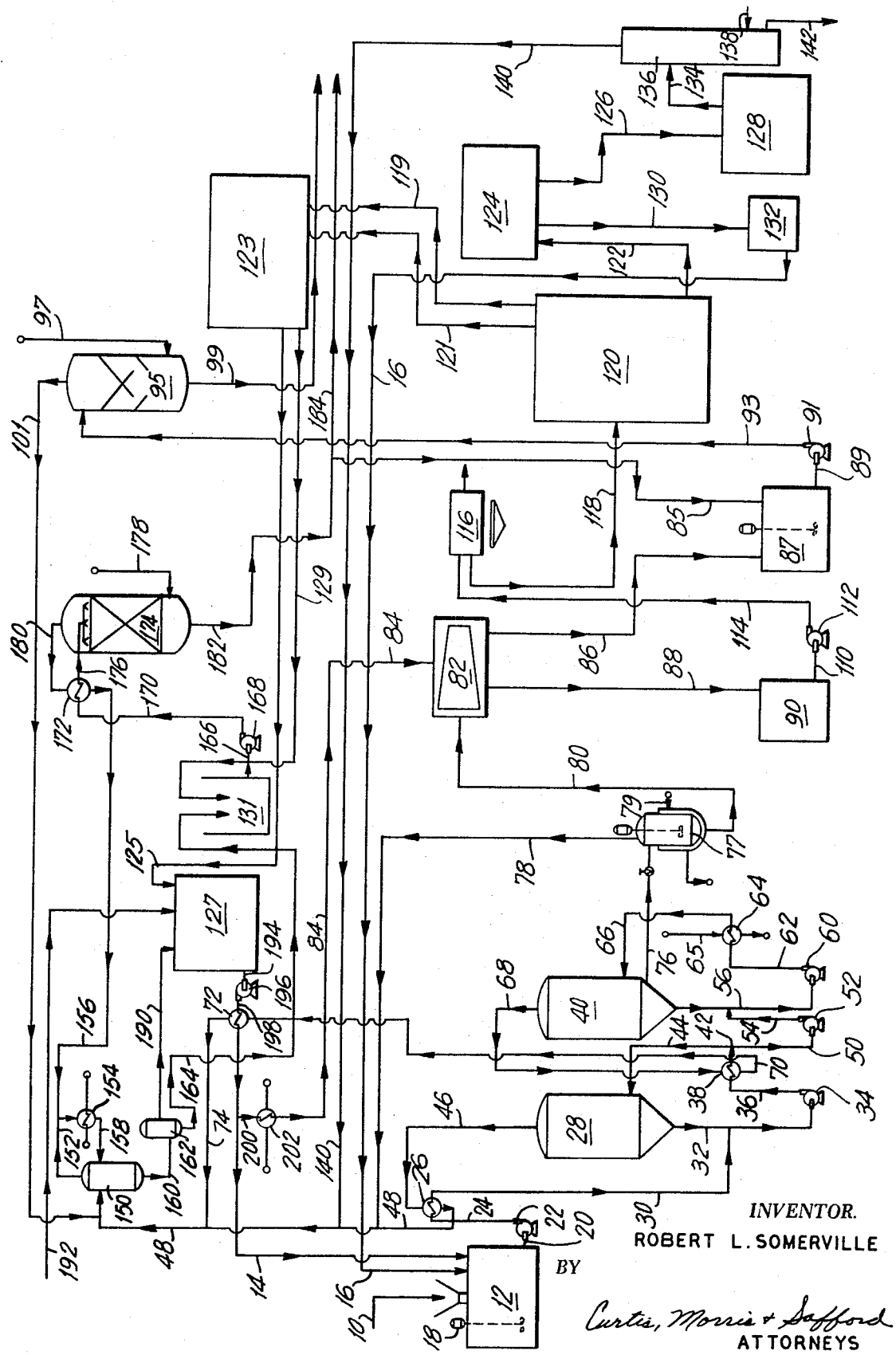

PROCESS FOR DRYING HYDROPHILIC ORES AND RECOVERING SULFUR THEREFROM

This invention relates to a process for the removal of water from hydrophilic, water-wet solids. More specifically it relates to a process for commercially drying crushed hydrophilic ores and leaching therefrom valuable components. Even more specifically it relates to a process for removing water from hydrophilic, sulfur bearing ores by an azeotropic evaporation process in which sulfur is simultaneously leached from the ore.

Conventional processes for drying wet, hydrophilic solids often involve substantial investment in equipment and require large amounts of inefficiently utilized energy. Rotary dryers, for example, are expensive, and the thermal energy input to reduce the water content of particulate solids dried therein is substantially greater than theoretical considerations would indicate. This inefficiency derives, in part, from poor heat and mass transfer coefficients which are inherent in drying a wet solid with a hot airstream and in part from the difficulties encountered in operating heat recoupment exchangers. Feed-effluent airstream exchangers are prone to clog with particles of the solid being dried and in any event heat absorbed in vaporizing water is not recoverable.

Where the solids to be dried are of a hydrophilic nature the problems encountered in drying are yet more serious. Certain ores, for example, have microporous structures which tenaciously adsorb water molecules. If water removal is a necessary first step in extracting valuable components, an improved drying process for these ores is needed to make the overall extraction process economically attractive.

Elemental sulfur bearing ores, particularly those of volcanic origin are typical of ores which must be substantially dried before it is economic to leach sulfur from the gangue. The volcanic ores of the Lake Ixpaco region in Guatamala for example, consist of finely divided sulfur particles mechanically mixed with volcanic ash. The ash contains hydrated silica and alumina which in dehydration develops a microporous structure similar to that of activated silica or alumina, and is capable of adsorbing and holding large liquid molecules. The ore which naturally contains from 20 to 90 percent sulfur, on a dry basis, is first concentrated by flotation techniques to a concentration of 80 percent or more. The flotation concentrate after draining is leached with a sulfur solvent such as xylene and the extract processed by crystallization or distillation techniques to recover sulfur.

Merely draining the concentrated ore, however, does not prepare it for the action of the leaching solvent. The hydrophilic gangue adsorbs as much as 43 percent water. The retained water, in which sulfur is insoluble, completely wets the sulfur and effectively prevents contact of solvent and sulfur. Agitation is not effective and it is thus necessary to remove a substantial portion of the retained water before leaching will take place. It is, of course, possible to dry flotation concentrate by conventional techniques but these operations are expensive and unsatisfactory for the reasons discussed.

It is thus a primary object of this invention to provide a process for economically drying water-wet, solids, particularly those of a hydrophilic nature.

It is a further object of this invention to provide a process for the efficient removal of water from crushed hydrophilic ores to permit further processing of those ores by solvent extraction or other recovery techniques.

It is a further and more specific object of this invention to provide a process for the removal of water from flotation concentrates of hydrophilic, sulfur-bearing ores to permit the simultaneous leaching of sulfur from those ores.

These and other objects of the invention are achieved by evaporating water from a slurry of wet hydrophilic solid in a water-immiscible organic liquid. The wet particulate solid is first slurried in the organic liquid, the organic liquid usually comprising the continuous phase and the particulate solid, the discontinuous phase. The slurry is then subjected to evaporating conditions and a combination of water vapor and organic vapor is removed. Particulate solid of reduced water content is then separated from the organic liquid.

Sufficient organic liquid must be used in forming the slurry to ensure that after water and some organic liquid are evaporated, there is still sufficient inventory to suspend the solids. Organic liquids boiling above and below water can be used; good results and consistent operating conditions are obtained since the organic liquid and water act as an azeotropic mixture.

It is desirable to subject the three-phase slurry of organic liquid, water and wetted particulate solids to multiple-effect evaporation, to increase the economy of operation. The vapors after interstage condensation are separated by well-known phase separation techniques and the organic liquid is recycled to the slurry formation step. The slurry of dried solids is then filtered or settled to remove the solids and the solid-free organic liquid is recycled to the slurry formation step. Residual organic liquid in the dried solid can be removed therefrom by steam distillation from an aqueous slurry or by stripping with super-heated steam.

Valuable components, mechanically intermixed with water-wet, hydrophilic, particulate solids can be leached therefrom in a process similar to that described above. A slurry of the water-wet solid is formed in a water-immiscible organic liquid in which the valuable component is soluble. As water is evaporated, the organic liquid and valuable component are intimately contacted and the valuable component goes into solution. At the end of the evaporation process, the dry gangue is removed from the solution of valuable component by settling or filtration. This process is particularly used for leaching finely divided sulfur particles from hydrophilic sulfur bearing ores such as those at Lake Ixpaco. The crushed ore after flotation concentration and draining is slurried in a water-immiscible organic liquid such as xylene in which sulfur is soluble. The slurry is then evaporated in multistage evaporators and substantially all water and a portion of the organic liquid is removed, thus permitting organic liquid to contact and dissolve elemental sulfur. Sulfur-free gangue is ultimately separated from the sulfur solution by settling, filtration or other suitable techniques.

A preferred process for the simultaneous drying and leaching of Lake Ixpaco sulfur ore is described in detail below. In brief, the process includes the following steps. Crushed sulfur-bearing ore is concentrated by flotation techniques and thereafter drained to provide a wet concentrate containing 57 percent solids and 43 percent water. The solids contain about 80 percent sulfur on a dry basis. The drained concentrate is neutralized to a pH of 6.5 to 7.0 with ammonia or lime and is then slurried in a mixture of distilled xylene and recycled xylene from the recovery areas of the process. In the slurry, xylene comprises the continuous phase, and wet ore concentrate comprises the discontinuous phase. The slurry is pumped to the last effect of a double effect evaporator which operates at approximately atmospheric pressure and 200° F. An azeotropic mixture of water and xylene, about 1.75 pounds of xylene per pound of water, is evaporated. As the water is evaporated from the slurry, xylene comes into contact with sulfur and sulfur begins to dissolve. The Slurry is continuously transferred from the last to the first effect which operates at 50 psig and 280° F. Substantially all of the remaining water is driven off in the azeotropic vapor, leaving an evaporator product comprising 32 percent sulfur in xylene. The heat required to evaporate the azeotropic vapor is not substantially greater than that required to remove water alone. The latent heat of vaporization of xylene is 147 BTU per pound. Thus 260 BTU are required to vaporize 1.75 pounds of xylene with each pound of water. This 25 percent additional heat load is more than offset by the economies of the double effect evaporator. Obviously, greater heat economies are achieved with triple or quadruple effect systems. The actual number specified depends upon further economic analysis. After a final flash to remove the last traces of water, the evaporator product is centrifuged. The separated gangue is washed with pure xylene to remove sulfur laden xylene and then reslurried in hot water and steam distilled to recover residual xylene. The gangue is discarded with but minor amounts of sulfur and xylene. The several mixed water and xylene vapor streams formed in the evaporators are passed to a xylene-water system including condensers and decanters wherein xylene and water are separated and returned to the process.

Pregnant xylene from the centrifuge, after filtration to remove traces of gangue, is processed to recover sulfur. Either a crystallization process or a distillation process can be used. In the former, rhombic crystals of sulfur are precipitated from solution in a two-stage unit; mother liquor and crystals are separated in a centrifuge; and mother liquor is recycled to the slurry formation step. The sulfur is melted, stripped to remove traces of xylene and removed to storage.

IN THE DRAWING

The FIGURE is a detailed process flow sheet showing the steps of slurry formation, evaporation, centrifugation, xylene water separation and recovery and gangue stripping. The steps of sulfur crystallization, melting and stripping are shown in generalized form as they do not form a central part of the invention. Flow rates and temperature operating conditions of important streams are given in Table 1. The flows, in lbs. per hour, correspond to a sulfur production of 300 long tons per day. Stream numbers correspond to those on the Figure.

A stream of drained ore concentrate is fed via line 10 to concentrate slurry tank 12. Pure xylene from storage and recycled xylene from the sulfur crystallization step are fed via lines 14 and 16 respectively to tank 12 and are mixed therein with ore concentrate by means of agitator 18. The slurry then passes via line 20 pump 22 and line 24 to heat exchanger 26, wherein it is preheated by condensing vapors from second effect evaporator 28. It then passes via line 30 to liquid draw off line 32 of second effect evaporator 28 and is mixed therein with partially evaporated slurry. The combination stream then passes via pump 34 and line 36 to reboiler 38 wherein it is partially vaporized by condensing vapors from first effect evaporator 40. The partially vaporized stream then passes via lines 42 and 44 to the main body of second effect evaporator 28. An azeotropic water/xylene vapor is disengaged from the slurry and passes via line 46 to heat exchanger 26. The condensate from exchanger 26 then passes via line 48 to the xylene-water separation system to be discussed in detail below.

A portion of the partially dried stream in line 42 passes via line 50, pump 52 and line 54 to line 56 which contains dried slurry from first effect evaporator 40. The combined stream passes via line 56, pump 60 and line 62 to reboiler 64 wherein it is partially vaporized by condensing steam provided via line 65. The partially vaporized slurry passes via line 66 to the main body of first effect evaporator 40 and the azeotropic vapor and concentrated slurry are separated. The vapor passes via line 68 to reboiler 38 and is condensed; the condensate passes via line 70, heat exchanger 72 and line 74 to line 48, the main feed line to the xylene-water separation system. The concentrated xylene from the first effect evaporator passes via line 76 to flash evaporator 77. This unit operates at substantially reduced pressure and water not removed from the slurry in the second or first effect evaporators is removed here. Steam is provided to the jacket of evaporator 77 via line 79. The vapors pass via line 78 to line 48, which feeds the xylene-water separation system.

The slurry of sulfur-bearing ore in xylene, from which substantially all water has been removed, leaves flash evaporator 77 via line 80 and passes to gangue centrifuge 82. This is a long-contour solid bowl centrifuge or pusher type or screen bowl wherein recovered xylene washes sulfur laden xylene from the centrifuged gangue. This latter stream of xylene enters the centrifuge via line 84. The washed gangue is removed from centrifuge 82 via line 86 and is transferred to gangue slurry tank 87. It is slurried therein in hot process water supplied via line 85 and then pumped via line 89, pump 91 and line 93 to gangue stripper 95. The gangue is stripped with steam supplied via line 97 to recover xylene values therein and is then transferred to a tailings pond or other disposal area via line 99. The overhead vapor stream from gangue stripper 95 passes via line 101 to line 48, the feed manifold to the water-xylene separation system.

The pregnant xylene solution from centrifuge 82 passes via line 88 to pregnant xylene storage tank 90. This tank acts as intermediate storage for feed to the sulfur recovery systems downstream. The pregnant xylene is first transferred via line 110, pump 112 and line 114 to polishing filter 116 to remove traces of gangue and then via line 118 to two-stage crystallization zone 120. The first stage crystallizer operates at about 200° F with a recycle of seed crystals from the second stage. Hot pregnant xylene is rapidly dispersed in cooler magma so that sulfur forms as rhombic rather than monoclinic crystals. The sensible heat in the feed and the heat of crystallization are removed in xylene vapor. Vacuum conditions are maintained on the second stage by suitable steam jet ejectors connected thereto. The xylene from the two crystallizers passes via lines 119 and 121 to xylene recovery system 123, wherein it is condensed and separated from water introduced by the steam jet ejector. After separation by decantation the xylene is returned via line 125 to xylene tank 127 and the water is returned via line 129 to process water tank 131.

The coarse, free filtering sulfur crystals and xylene mother liquor pass via line 122 to continuous centrifuge 124 which may be of the screen bowl or Escherwyss pusher type. Mother liquor and sulfur crystals are separated; the sulfur crystals are dumped via line 126 into melting tank 128; and the mother liquor passes via line 130 to mother liquor storage tank 132 from which it is recycled via line 16 to concentrate slurry tank 12. Melted sulfur is pumped via line 134 to sulfur stripper 136 wherein it is countercurrently contacted with steam supplied via line 138 to strip out residual xylene. The stripper vapor is returned via line 140 to the water-xylene separation system discussed in detail below and the stripped sulfur passes to storage via line 142.

The several streams generated in the process which contain xylene and water are combined and processed together in a xylene-water separation system. Condensed vapors from the second and first effect evaporators, overhead from the flash evaporator, overhead from the sulfur stripper and overhead from the gangue stripper are transferred via lines 48, 74, 78, 140 and 101 respectively to xylene-water flash tank 150. Xylene and water flash therein and the vapors pass overhead via line 152 to condensor 154. They are condensed with vapors from the water stripper supplied via line 156 and the condensate is returned to flash tank 150 via line 158. Condensed water and xylene pass via line 160 to phase separator 162. Water, the heavier phase, passes via line 164 to process water tank 131 wherein it is combined with process water recovered from xylene recovery system 123 and supplied via line 129. The process water is pumped via line 166, pump 168 and line 170 to heat exchanger 172 wherein it is preheated by overhead from water stripper 174. The preheated process water enters stripper 174 via line 176 and is stripped therein by steam supplied via line 178, to remove xylene. The xylene-water vapor overhead passes via line 180, heat exchanger 172 and line 156 to heat exchanger 154 in the xylene-water separation system. Water from the bottom of stripper 174 is removed via line 182; a portion thereof is fed via line 85 to gangue slurry tank 87; and excess process water is discarded via line 184.

Xylene, the lighter phase in phase separator 162, passes via line 190 to pure xylene tank 127 wherein it is combined with make-up xylene via line 192 and xylene via line 125 from xylene recovery system 123. Xylene from tank 127 passes via line 194, pump 196, line 198 and heat exchanger 72 to line 14 which feeds concentrate slurry tank 12. A portion of this latter stream passes via line 200, steam preheater 202 and line 84 to centrifuge 82 wherein it is used to wash sulfur laden xylene from centrifuge gangue.

TABLE I

Sulfur production: 300 long tons /day

Flow rates in lbs./hr.

| Name | Stream No. | | | | | | | |
|---|---|---|---|---|---|---|---|---|
| | 10 | 14 | 16 | 30 | 46 | 50 | 63 | 76 |
| | Flotation concentrate | Xylene | Xylene mother liquor | Evaporator feed | Second effect vapor | Interstage transfer | First effect vapor | Flash evaporator feed |
| Component: | | | | | | | | |
| Sulfur (liquid) | | | | 1,300 | 2,587 | | 30,567 | 30,567 |
| Sulfur (solid) | 29,267 | | | 27,980 | | | | |
| Gangue | 6,994 | | | 6,994 | | 6,994 | | 6,994 |
| Xylene | | 101,970 | 24,677 | 126,647 | 24,812 | 101,835 | 24,692 | 77,143 |
| Water or steam | 29,313 | | | 29,213 | 13,503 | 15,810 | 14,596 | 1,214 |
| Total | 65,574 | 101,970 | 25,977 | 193,521 | 38,315 | 155,206 | 39,288 | 115,918 |
| Temperature (° F.) | 70 | 175 | 175 | 209 | 209 | 209 | 280 | 280 |

| Name | Stream No. | | | | | | |
|---|---|---|---|---|---|---|---|
| | 78 | 80 | 84 | 86 | 88 | 99 | 142 |
| | Flash vapors | Gangue Centrifuge feed | Xylene wash | Gangue | Pregnant solution | Stripped gangue | Sulfur product |
| Component: | | | | | | | |
| Sulfur (liquid) | | 30,567 | | 1,105 | 29,462 | 1,105 | 28,000 |
| Sulfur (solid) | | | | | | | |
| Gangue | | 6,994 | | 6,788 | 206 | 6,788 | |
| Xylene | 4,573 | 72,570 | 16,800 | 5,650 | 83,720 | *135 | |
| Water or steam | 1,214 | | | | | 17,920 | |
| Total | 5,787 | 110,131 | 16,800 | 13,543 | 113,388 | 25,813 | 28,000 |
| Temperature (° F.) | 280 | 280 | 280 | 280 | 280 | 209 | 150 |

*Estimated.

The organic liquid used to form the slurry of wet, particulate solid can be any water-immiscible liquid having a relatively low boiling point. Liquids boiling above and below water can be used. Liquids boiling well below water are not economic to use since large quantities must be used to remove relatively small amounts of water. Higher boiling liquids, though more economic in the drying step are difficult to remove from a leached component or from gangue. A particularly advantageous organic liquid is ordinary commercial grade xylene. It is relatively available and inexpensive and ample data on its physical and chemical properties have been reported in the literature. It is a recognized solvent for elemental sulfur and satisfactory for use in the evaporation steps of this process since its boiling point under atmospheric pressure is approximately 35° F higher than the melting point of sulfur. Furthermore, the temperature-solubility curve of sulfur in xylene is relatively steep and sulfur can be crystallized from solution easily by temperature reduction. The vapor pressure is such as to result in an economical steam-xylene distillation ratio and no substantial costs are incurred in vaporizing xylene with water, as discussed above. Lastly, xylene has a relatively high flash point and auto-ignition temperature and is chemically quite stable so that reaction with sulfur or chemical degradation is negligible.

Other sulfur recovery techniques can be used to separate sulfur from the pregnant solution of sulfur in xylene. In one preferred technique the sulfur and xylene are distilled in a one stage zone. The xylene vapor overhead product is then used to reboil a water-xylene evaporator operated under vacuum. Substantial steam economies are thereby effected. The disadvantage of the distillation process is that all xylene soluble impurities in the ore report in the sulfur.

The overall drying process finds application in processes other than those discussed herein. It is adaptable, for example, to the removal of moisture from leach zone phosphate ore.

What is claimed is:

1. In an integrated process for extracting sulfur from water-wet, hydrophilic ore, wherein said wet ore is contacted and extractively evaporated in the presence of xylene to form a substantially water-dry solution of sulfur, the said water-dry solution is separated from the gangue of said ore, said solution is subjected to crystallizing conditions to recover the sulfur, and xylene is recovered from the sulfur crystallizing step and from the extractive evaporation and recycled to said ore contacting step, the improvement which comprises performing said extractive evaporation in a two-stage, countercurrent evaporator wherein the feed is preheated by the vapors emanating from the stage to which they are fed, and thereafter flash evaporating the mixture of ore and solvent leaving the said two-stage, countercurrent evaporator and recovering the condensed vapors from said flash evaporator for reuse in said ore contacting operation.

* * * * *